United States Patent [19]

Soma et al.

[11] Patent Number: 5,068,853

[45] Date of Patent: Nov. 26, 1991

[54] FAIL-SAFE APPARATUS FOR IMAGE FORMING APPARATUS

[75] Inventors: Utami Soma; Yasufumi Koseki; Minoru Asakawa, all of Hachioji, Japan

[73] Assignee: Konica Corporations, Tokyo, Japan

[21] Appl. No.: 399,317

[22] Filed: Aug. 28, 1989

[30] Foreign Application Priority Data

Aug. 30, 1988 [JP] Japan ........................ 63-217143

[51] Int. Cl.[5] ........................ G06F 11/00

[52] U.S. Cl. ........................ 371/16.3; 371/14; 371/62

[58] Field of Search ........................ 371/16.3, 16.4, 14, 371/16.1, 62, 12, 66, 4; 364/200; 355/206

[56] References Cited

U.S. PATENT DOCUMENTS

| | | | |
|---|---|---|---|
| 4,488,303 | 12/1984 | Abramovich | 371/16.3 |
| 4,499,581 | 2/1985 | Miazga | 371/14 X |
| 4,598,355 | 7/1986 | Shepler | 371/14 X |
| 4,644,541 | 2/1987 | Linkowski | 371/16.4 |
| 4,745,542 | 5/1988 | Baba | 371/14 X |
| 4,812,677 | 3/1989 | Perry | 371/66 X |
| 4,835,761 | 5/1989 | Sato | 371/14 X |
| 4,868,817 | 9/1989 | Shigihara | 371/62 X |

*Primary Examiner*—Robert W. Beausoliel

*Attorney, Agent, or Firm*—Frishauf, Holtz, Goodman & Woodward

[57] ABSTRACT

A fail-safe apparatus for an image forming apparatus includes a central processing unit (CPU), a drive section or load, a disconnecting circuit, and a watchdog circuit. The CPU controls an image forming sequence. The drive section or load is controlled by the CPU through an input-output controller. The disconcerting circuit disconnects power supply to the drive section or load upon reception of a trigger signal. The watchdog circuit monitors an operation of the CPU so as to output a reset signal to the CPU and the input-output controller upon detection of an operation abnormality, and to output the trigger signal to the disconnecting circuit.

5 Claims, 2 Drawing Sheets

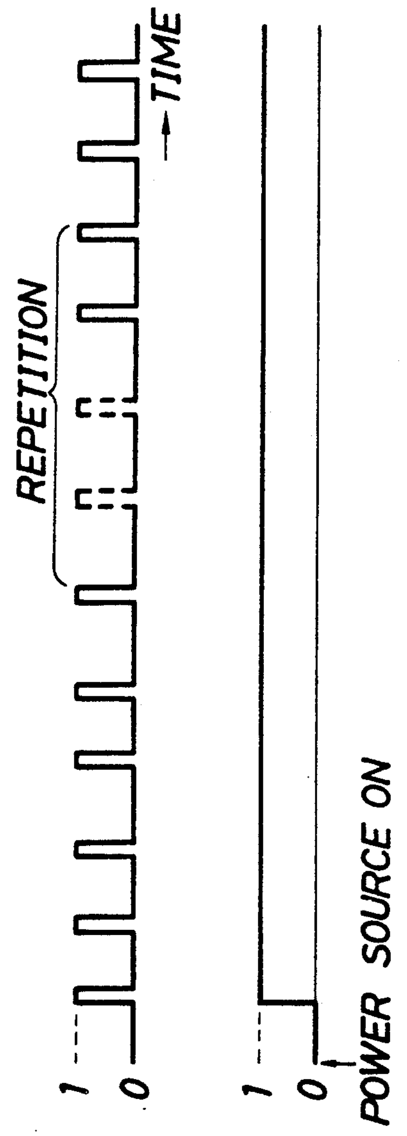
FIG. 2(a)
FIG. 2(b)
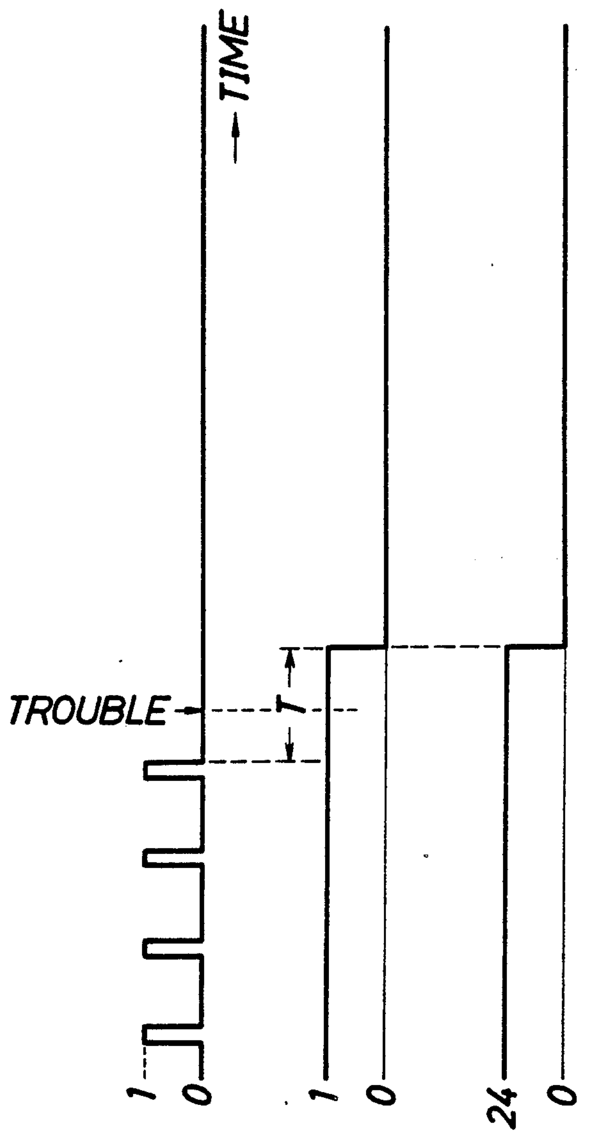
FIG. 3(a)
FIG. 3(b)
FIG. 3(c)

FAIL-SAFE APPARATUS FOR IMAGE FORMING APPARATUS

BACKGROUND OF THE INVENTION

1. Field of the Invention

The present invention relates to a fail-safe apparatus for an image forming apparatus in which a CPU is used to control an image forming sequence.

2. Description of the Prior Art

In an image forming apparatus, such as a copying machine, a printer, or a facsimile system, in which a CPU (central processing unit) is used to control an image forming sequence, the CPU or a peripheral IC such as an input-output controller may be erroneously operated due to some abnormality, e.g., external noise. In this case, the overall drive, system of the image forming apparatus overruns, and the internal functions may be damaged In order to prevent this, a watchdog circuit is provided. The watchdog circuit always monitors the operation of the CPU by fetching predetermined pulse signals from the CPU and converting these pulses into a continuous signal. If no continuous signal appears for a predetermined time period, this circuit supplies a reset signal to the CPU or the peripheral IC so as to stop the sequence of the image forming apparatus, thus preventing damage.

Such a fail-safe apparatus is disclosed in detail in Japanese Patent Laid-Open (Kokai) No. 55-146457.

Generally, an error often occurs in an image forming sequence because of generation of noise (due to lightening) at a high-voltage portion of an image forming apparatus. In such a case, failure instantaneously occurs in a peripheral IC or in electronic circuits near a load. Then, even if the CPU is reset and the image forming sequence is stopped, a certain error condition may independently remain in each peripheral portion of the image forming apparatus. For this reason, such an apparatus is not as a fail-safe apparatus.

When the CPU is reset, the program in the CPU of the sequence is initialized and the operation is started in a new mode. Therefore, for example, if the sequence is for a feed operation to transfer paper this operation remains to be performed. That is, the transfer paper is in a jam state, and a jam indication lamp is turned on. However, it is not clear from the appearance of the state whether this indication light means a normal jam state or a jam state resulting from an operation of the watchdog circuit due to some abnormality. Therefore, when a serviceman repairs the apparatus, confirmation of the cause becomes difficult. As described above, the conventional prior art fail-safe apparatus is not perfect.

SUMMARY OF THE INVENTION

It is an object of the present invention to provide a fail-safe circuit for an image forming apparatus using a CPU to control an image forming sequence, in which a watchdog circuit always monitors the operation of the CPU and is arranged to prevent an error in the image forming apparatus due to variation in power thereof and noise, so that the watchdog circuit detects any abnormality and resets the CPU and/or a peripheral IC, and a circuit for disconnecting the power supply to each load without control of the CPU, thereby solving the conventional problems and assuring safety.

In order to achieve the above object, there is provided a fail-safe apparatus for an image forming apparatus using a CPU to control an image forming sequence, in which a watchdog circuit for monitoring the operation of the CPU, and a means for disconnecting the power supply to each load are arranged so that when the watchdog circuit is operated, a reset signal is supplied to the CPU and/or a peripheral IC, and the power supply to each load is disconnected without control of the CPU.

BRIEF DESCRIPTION OF THE DRAWINGS

FIGS. 2(*a*) and. 2(*b*) are timing charts respectively showing pulse signals at points A and B in FIG. 1 when an image forming sequence normally proceeds; and FIGS. 3(*a*), 3(*b*), and 3(*c*) are timing charts respectively showing signals at the points A and B and a voltage state a point C in FIG. 1 when the image forming sequence does not normally proceed.

DETAILED DESCRIPTION OF THE PREFERRED EMBODIMENTS

Figure 1:
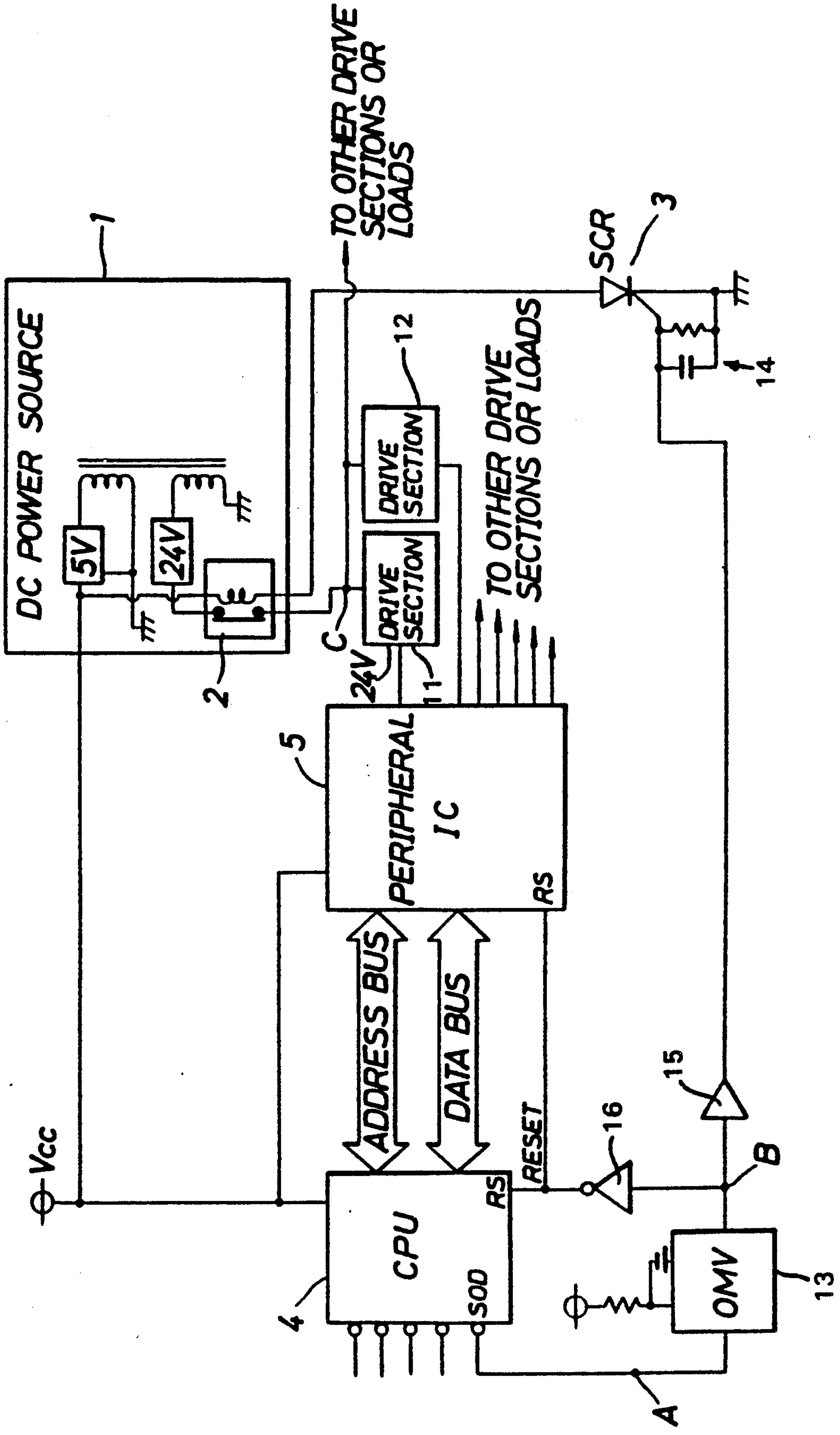
FIG. 1 is a block diagram showing an electronic circuit of a fail-safe apparatus of the present invention.

FIG. 1 is a block diagram showing a fail-safe apparatus according to an embodiment of the present invention. In this case, the fail-safe apparatus is incorporated in a copying machine. FIGS. 2(*a*) and 2(*b*) respectively show signals at points A and B in FIG. 1 when an image forming sequence using an electrophotographic process normally proceeds. FIGS. 3(*a*), 3(*b*), and 3(*c*) respectively show signals at the points A and B and a voltage state at a point C in FIG. 1 when the image forming sequence does not normally proceed.

Referring to FIG. 1, a CPU 4 controls an image forming sequence in accordance with a corresponding program, and supplies drive signals to the respective operating sections 11, 12 of the image forming apparatus through a peripheral, IC 5 as an interface. Note that FIG. 1 shows only one of the peripheral ICs as the IC 5 for the sake of simplicity.

Drive power (5 V) is supplied from a power source section 1 to the CPU 4, the peripheral IC 5, and a relay 2. In addition, the power source section 1 supplies a power (24 V) to other loads such as drive sections 11, 12. This power is supplied to each load through a contact of the relay 2 which is normally connected. In a copying machine, the drive sections 11, 12 or loads include an optical scanning drive section, a photosensitive drive section, a developing unit, a copy paper convey mechanism, and a fixing unit.

Reference numeral 3 denotes an SCR for driving (turning off) the relay 2. In addition, the CPU 4 includes a terminal SOD for outputting a predetermined pulse in accordance with the program. This output is connected to one-shot multivibrator OMV numeral 13 (to be referred to as an OMV hereinafter). An output from the OMV is supplied to reset terminals RS of the CPU 4 and the peripheral IC 5 through an inverter 16 and is also supplied to the gate of the SCR through a buffer circuit 15 and a resistor-capacitor circuit 14.

When the image forming apparatus is energized and a copy button is turned on, the CPU 4 supplies a pulse having a period t or a maximum period $t+\Delta t$ from the terminal SOD to the OMV in accordance with a predetermined program. The OMV includes a capacitor C and a resistor R (not·shown) so as to form an output signal having a time constant T which is longer than the maximum period $(t+\Delta t)$ of the pulse signal. Therefore, the OMV outputs a continuous signal upon reception of a pulse signal. FIGS. 2(*a*) and 2(*b*) show this state, in which the OMV outputs a "1"-level continuous signal upon reception of a pulse signal from the CPU 4 after energization of the image forming apparatus. This continuous signal is supplied through the inverter to the reset terminals RS of the CPU 4 and of the peripheral IC 5 for supplying drive signals to the respective drive sections such as a main motor, a clutch, and an exposure lamp. Since an input signal to the reset terminals RS is kept at "0" level in a normal operation, the image forming sequence proceeds in accordance with the program of the CPU 4. For example, a known electrophotographic process is executed. However, when an abnormality, e.g., erroneous operation of the CPU 4 or a memory failure, occurs for example due to noise, the operation of the CPU 4 deviates from the program, and at the same time the output of the pulse signal from the terminal SOD of the CPU 4 is stopped, as shown in FIG. 3(*a*). As a result, the output from the OMV goes to "0" level time T after output of the pulse signal is stopped, as shown in FIG. 3(*b*). In accordance with this state, the reset terminals RS of the CPU 4 and the peripheral IC 5 go to "1" level (H level) so as to be reset, thereby stopping the image forming sequence and performing initialization. With this operation, an erroneous operation associated with the image forming sequence is prevented.

When the output from the OMV is set at "0" level (L level), a signal which is inverted by buffer 15 triggers the SCR 3. As a result, the SCR 3 is rendered conductive to drive the relay 2 and turn off the contact of the relay 2, which is connected in a normal operation, thereby disconnecting all the supply of the power (24 V), as shown in FIG. 3(*c*). This operation eliminates the possibility of failures due to chain reactions. In addition, since the SCR 3 is not turned off unless the power source section 1 is turned off, this fail-safe apparatus has a function of holding a state of occurrence of an abnormality.

Note that a light-emitting diode LED may be connected to the output terminal of the OMV through an amplifier so as to display the presence/absence of an abnormality, although this arrangement is not shown.

The above-described watchdog circuit can be easily formed by using normal ICs such as SN74112.

The present invention is not limited to the one shown in the drawings. For example, if a CPU having no serial pulse output terminal is used, a pulse signal may be fetched from the CPU through an output board so as to be supplied to the OMV. In order to convert a pulse signal into a continuous signal, an OMV need not be necessarily used, but a converting circuit having the same function can be used.

As has been described above, in an image forming apparatus in which a CPU is used to control an image forming sequence, when the CPU or a peripheral IC is erroneously operated due to some abnormality, e.g., variation of a power source voltage or external noise, the overall drive system of the image forming apparatus overruns. In this case, even if the sequence of the CPU is stopped, the function of each drive section of the image forming apparatus may be damaged. Such a problem, however, can be completely eliminated by the present invention, thus providing a highly reliable fail-safe apparatus for an image forming apparatus.

In addition, according to the fail-safe apparatus of the present invention, when a failure occurs in the apparatus, a user or a serviceman can easily locate the failed portion, and a normal operation state can be restored by an ON/OFF operation of a switch.

As will be understood by those familiar with the art, the present invention may be embodied in other specific forms without departing from the spirit or essential characteristics thereof. Accordingly, the disclosure of the preferred embodiments of the present invention is intended to be illustrated, but not limiting, of the scope of the invention which is set forth in the following claims.

What is claimed is:

1. Image forming apparatus having a fail-safe protection means, comprising:

a central processing unit for controlling an image forming operation in said image forming apparatus, said central processing unit having a normal operating state and an abnormal operating state;

an input/output controller connected to said central processing unit;

a plurality of utilization means in said image forming apparatus connected to said input/output controller for performing said image forming operation as commanded by said central processing unit;

power supply means coupled to said central processing unit, to said input/output controller, and to said plurality of utilization means;

monitoring means coupled to said central processing unit for detecting said states of operation of said central processing unit for generating a first monitor output signal when said central processing unit is operating in said normal state and a second monitor output signal when said central processing unit is operating in said abnormal state, said first and second monitor output signals being supplied to said input/output controller and to said central processing unit;

said first monitor output signal enabling said central processing unit and said input/output controller to continue to perform said image forming operation, and said second monitor output signal actuating said input/output controller to stop said image forming operation and to reset said central processing unit; and fail-safe disconnecting means independent of said central processing unit and said input/output controller coupled between said power supply means and said monitoring means for disconnecting said power supply means from said utilization means when said monitoring means generates said second monitor output signal, whereby said fail-safe disconnecting means assures that said image forming operations are stopped even if said input/output controller malfunctions to permit said image forming process to proceed after said monitoring means generates said second monitor output signal indicating a malfunction in said central processing unit.

2. The apparatus according to claim 1, wherein said monitoring means comprises a one-shot multivibrator that is activated whenever a predetermined pulse signal from said central processing unit is detected.

3. The apparatus according to claim 1, wherein said plurality of utilization means includes at least one drive section in said image forming apparatus, and wherein said fail-safe disconnecting means remains active to disconnect said power supply from said utilization means until said drive section of said image forming apparatus stops operating.

4. An apparatus according to claim 3, wherein said fail-safe disconnecting means comprises a relay having a normally closed contact coupled between said power supply means and said drive section, and a thyristor connected to said relay which is activated by said second monitor output signal so as to drive said relay to open said normally closed contact.

5. An apparatus according to claim 1, wherein said fail safe disconnecting means comprises switching means coupled between said power supply means, said monitoring means and said utilization means for disconnecting said power supply means from said utilization means whenever said second monitor output signal is generated by said monitoring means.

* * * * *

UNITED STATES PATENT AND TRADEMARK OFFICE

CERTIFICATE OF CORRECTION

PATENT NO. : 5,068,853

DATED : November 26, 1991

INVENTOR(S) : SOMA et al

It is certified that error appears in the above-identified patent and that said Letters Patent is hereby corrected as shown below:

On the title page:

Title page, Section [56] References Cited, right column, below "U.S. Patent Documents", insert the following:

FOREIGN PATENT DOCUMENTS -

55-146457 11/1980 Japan

Signed and Sealed this

Eighth Day of June, 1993

*Attest:*

MICHAEL K. KIRK

*Attesting Officer*

*Acting Commissioner of Patents and Trademarks*